(12) United States Patent
Lynch

(10) Patent No.: US 9,574,693 B2
(45) Date of Patent: Feb. 21, 2017

(54) ACOUSTIC LOAD MITIGATOR

(75) Inventor: John J. Lynch, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 882 days.

(21) Appl. No.: 13/212,528

(22) Filed: Aug. 18, 2011

(65) Prior Publication Data
US 2011/0299649 A1 Dec. 8, 2011

Related U.S. Application Data

(62) Division of application No. 11/940,634, filed on Nov. 15, 2007, now Pat. No. 8,068,575.

(51) Int. Cl.
*G21C 9/00* (2006.01)
*F16L 55/04* (2006.01)

(52) U.S. Cl.
CPC ...................... *F16L 55/04* (2013.01)

(58) Field of Classification Search
USPC ......... 376/283, 277; 181/216, 241, 253, 271
See application file for complete search history.

(56) References Cited

U.S. PATENT DOCUMENTS

| | | | |
|---|---|---|---|
| 2,574,151 A | 11/1951 | Laidley | |
| 2,775,255 A * | 12/1956 | Snyder | 137/87.01 |
| 3,422,853 A * | 1/1969 | Schmid | 138/30 |
| 3,628,573 A | 12/1971 | Loliger et al. | |
| 3,744,527 A * | 7/1973 | Mercier | 138/30 |
| 4,305,429 A | 12/1981 | Parras | |
| 4,338,793 A | 7/1982 | O'Hern, Jr. | |
| 4,562,036 A * | 12/1985 | Shin et al. | 376/283 |
| 4,867,190 A | 9/1989 | Jungowski et al. | |
| 4,893,841 A | 1/1990 | Bowen | |
| 4,912,733 A | 3/1990 | Gluntz | |
| 5,311,904 A | 5/1994 | Beppu | |
| 5,321,731 A | 6/1994 | Oosterkamp | |
| 5,333,576 A | 8/1994 | Verkleeren | |
| 5,885,333 A | 3/1999 | Dix | |
| 5,924,436 A | 7/1999 | Kitani et al. | |
| 5,988,218 A | 11/1999 | Hecking | |

(Continued)

FOREIGN PATENT DOCUMENTS

| | | | |
|---|---|---|---|
| EP | 1 070 903 A1 | 1/2001 | |
| EP | 1 939 249 A1 | 7/2008 | |
| JP | 1-283498 A | 11/1989 | |

OTHER PUBLICATIONS

Extended European Search Report mailed Mar. 6, 2009 in European Application No. 08168811.1.

(Continued)

*Primary Examiner* — Marshall O'Connor
(74) *Attorney, Agent, or Firm* — Nixon & Vanderhye P.C.

(57) ABSTRACT

A system for reducing an acoustic load of a fluid flow includes a first pipe to carry the fluid flow; a standpipe connected to the first pipe at an opening in the first pipe; and a standpipe flow tripper provided in the standpipe. The flow tripper includes an edge extending through the opening into the flow on a downstream side of the opening. A method of reducing an acoustic load of a standing wave in a standpipe connected to a first pipe configured to carry a flow includes disrupting the flow in the first pipe at a downstream side of an opening in the first pipe to which the standpipe is connected.

10 Claims, 5 Drawing Sheets

(56) References Cited

U.S. PATENT DOCUMENTS

| | | |
|---|---|---|
| 6,427,671 B1 | 8/2002 | Holze et al. |
| 6,457,551 B1 | 10/2002 | Chang |
| 6,705,267 B1 * | 3/2004 | Westerbeke et al. .... 123/184.53 |
| 6,705,344 B2 | 3/2004 | Poirier |
| 6,810,837 B2 | 11/2004 | Lazarus et al. |
| 6,966,328 B2 | 11/2005 | Benham |
| 2002/0189897 A1 | 12/2002 | Trochon |
| 2008/0149201 A1 | 6/2008 | Sommerville et al. |

OTHER PUBLICATIONS

Rockwell et al., "Review—Self-Sustaining Oscillations of Flow Past Cavities," Journal of Fluids Engineering, ASME, New York, vol. 100, No. 2, Jun. 1978, pp. 152-165.

\* cited by examiner

ACOUSTIC LOAD MITIGATOR

CROSS REFERENCE TO RELATED APPLICATION

This application is a divisional of U.S. application Ser. No. 11/940,634, filed Nov. 15, 2007, which is allowed, the entire contents of which are hereby incorporated by reference.

BACKGROUND OF THE INVENTION

The present invention relates generally to nuclear reactors, and more particularly to mitigating acoustic loads in a nuclear reactor.

In boiling water nuclear reactor (BWR), reactor coolant flows through a series of plenums starting with a lower core plenum, the nuclear core itself and an upper core plenum, each lying in communication with one another. The upper core plenum lies below a shroud head which has a series of standpipes that lead steam/water to a series of separators where the two-phase mixture of steam and water is separated. The separated water flows downwardly in an annulus about the core shroud for recirculation. The separated steam flows upwardly of the reactor through a steam dryer for flow outside of the reactor vessel to drive a turbine for generating power.

In BWR's, this flowing mixture of vapor and liquid must be separated efficiently to provide the dry steam required for steam turbine generators. Typical reactor designs employ primary separators, each of which includes a standpipe connected to the upper core shroud and which standpipe is topped with a helical flow diverter to create a swirl flow into an enlarged separation barrel section. The resultant radial acceleration field causes the higher density liquid to move outward and flow as a film on the separation barrel. Radial pick-off rings are provided at one or more axial positions along the barrel to intercept the liquid film flow and separate it from the interior vapor flow. Discharge passages direct the separated water to a water pool which partially submerges the primary separators.

One of the sources of loading that has destroyed or damaged equipment is acoustic resonance of the fluid inside a standoff pipe, such as a safety relief valve. The safety relieve valve, or valves, with steam flow past their entrances, and the acoustic resonance which naturally occurs, causes acoustic pressures to travel upstream, causing damage to devices, for example, the steam dryers.

Previous attempts to reduce damage to devices such as steam dryers have included predicting or estimating the loading on the steam dryer using Finite Element Analysis (FEA), and computing the stress on the dryer, and modifying the dryer to decrease the computed stresses.

Another attempt to reduce the damage to equipment such as steam dryers has included a Helmholtz resonator provided on the relief valves. However, the Helmholtz resonator is a large cantilevered bottle-shaped device which is difficult to support in the environment of a nuclear power generating station.

BRIEF DESCRIPTION OF THE INVENTION

In one embodiment of the invention, a system for reducing an acoustic load of a fluid flow comprises a first pipe to carry the fluid flow; a standpipe connected to the first pipe at an opening in the first pipe; and a standpipe flow tripper provided in the standpipe. The flow tripper comprises an edge extending through the opening into the flow on a downstream side of the opening.

In another embodiment of the invention, a method of reducing anacoustic load of a standing wave in a standpipe connected to a first pipe configured to carry a flow comprises disrupting the flow in the first pipe at a downstream side of an opening in the first pipe to which the standpipe is connected.

DETAILED DESCRIPTION OF THE INVENTION

Figure 1:
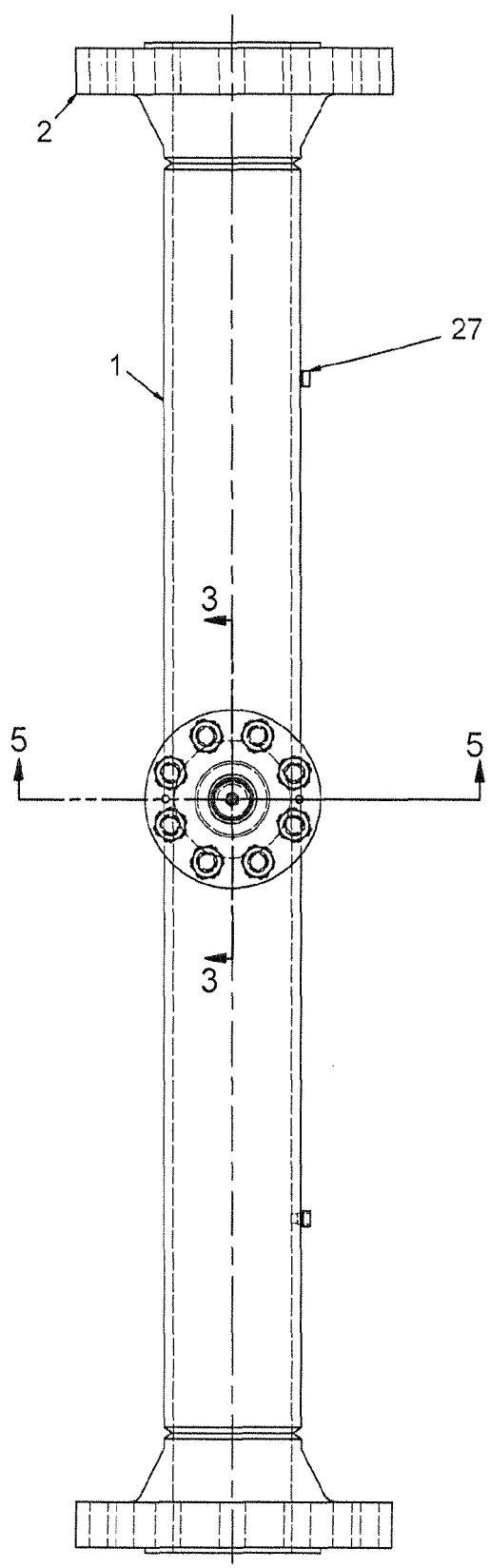
FIG. 1 is a plan view of a load mitigator according to an embodiment of the invention.

Referring to FIGS. 1-5, a steam line pipe 1, for example, in a nuclear power generating station such as a boiling water reactor (BWR) comprises pipe flanges 2 at opposite ends for connection of the steam line pipe 1 to a steam delivery line. A pressure sensor 27 may be provided in the steam line pipe 1 to measure a pressure of steam carried by the steam line pipe 1.

A standpipe 32 is connected to the steam line pipe 1 for mounting of a safety relief valve (not shown) to a pipe flange 8 of the standpipe 32. A pressure sensor 28 is provided on the pipe flange 8 to measure pressure of the steam in the standpipe 32.

Figure 3:
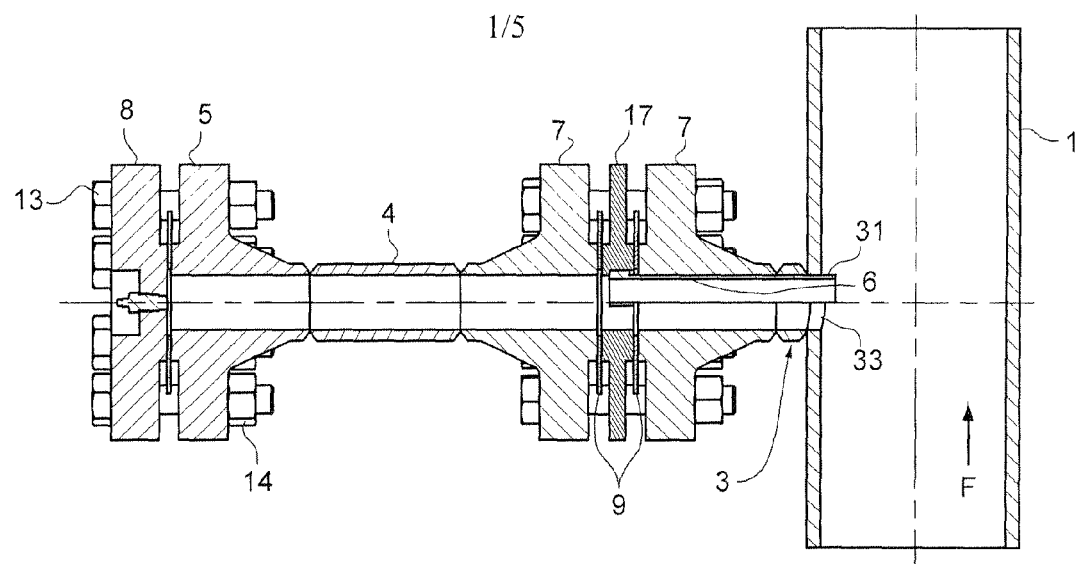
FIG. 3 is a cross section view of the load mitigator along line 3-3 in FIG. 1.
Figure 4:
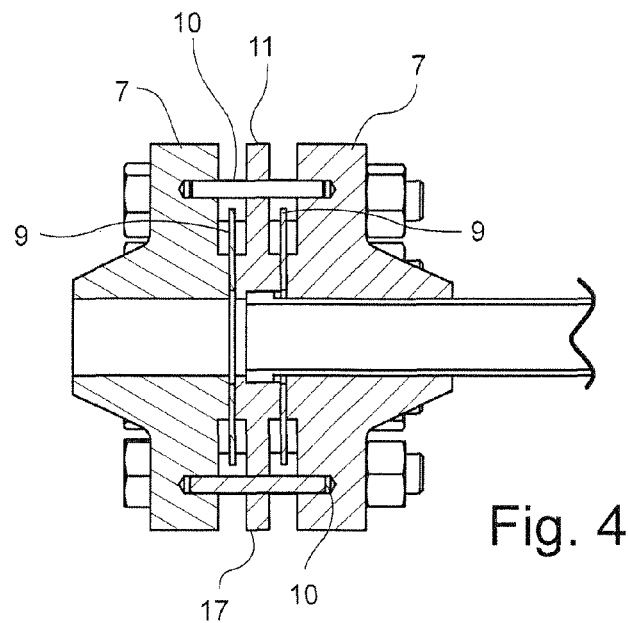
FIG. 4 is a cross section view of the load mitigator along line 4-4 in FIG. 2.
Figure 5:
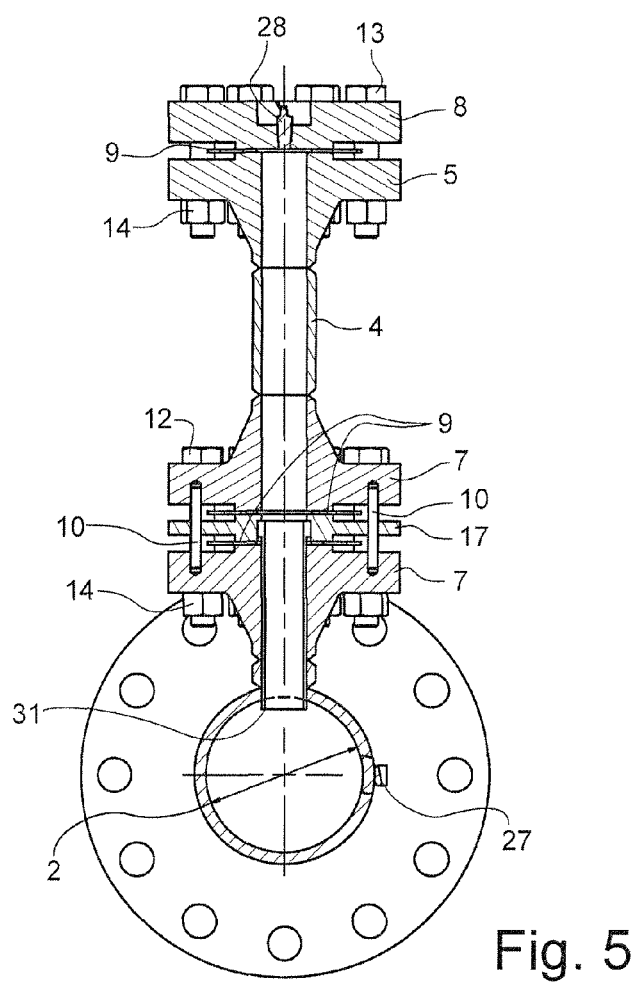
FIG. 5 is a cross section view of the load mitigator along line 5-5 in FIG. 1.

Referring to FIGS. 3-5, the standpipe 32 may be connected to the steam line pipe 1 by a pipe base 3. A first pipe flange 7 is connected to the pipe base 3. A second pipe flange 7 is connected to the first pipe flange 7 by fasteners, for example bolts 12 and nuts 14. A spacer 17 is provided between the first and second pipe flanges 7. Each side of the spacer 17 may be sealed with the pipe flange 7 by a seal 9, for example a gasket. As shown in FIGS. 4 and 5, the first and second pipe flanges 7 and the spacer 17 may be aligned by alignment pins 10.

Figure 2:
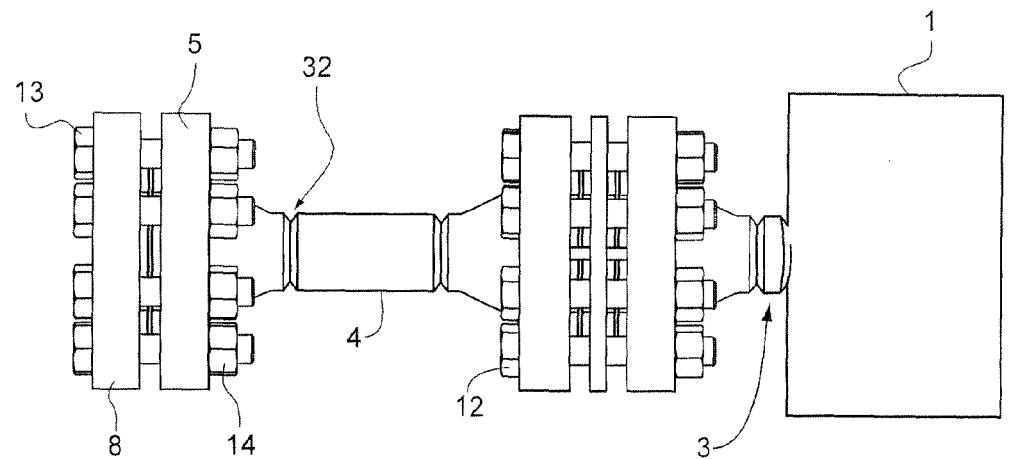
FIG. 2 is a side elevation view of the load mitigator of FIG. 1.

Referring to FIGS. 2, 3 and 5, the standpipe 32 further includes a pipe 4. The pipe 4 may be connected at one end to the pipe flange 7, for example by welding. A pipe flange 5 may be connected to the pipe 4 at the other end, for example by welding. The pipe flange 8 for connection of a safety relief valve (not shown) is connected to the pipe flange 5, for example by fasteners, such as bolts 13 and nuts 14. A seal 9, for example a gasket, may be provided between the pipe flanges 5, 8. The pressure sensor 28 may be provided in a tap of the pipe flange 8 for measuring a pressure in the standpipe 32. Although the pipe 4 is shown as connected to the pipe flanges 7, it should be appreciated that the pipe flange 5, the pipe 4 and the second pipe flange 7 may be formed as a one piece unitary structure.

Figure 6:
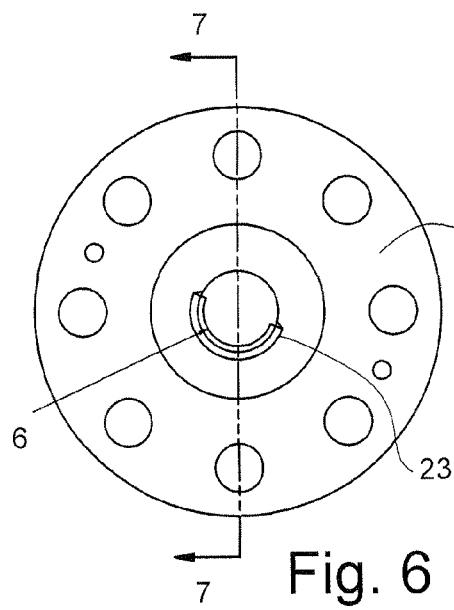
FIG. 6 is a plan view of a flow tripper assembly according to an embodiment of the invention.
Figure 7:
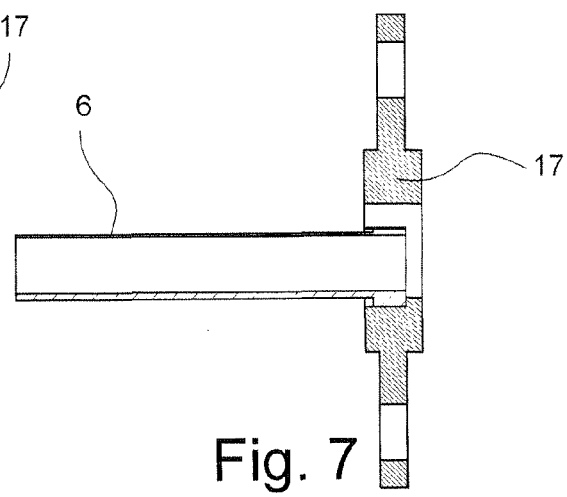
FIG. 7 is a cross section of the flow tripper assembly along line 7-7 in FIG. 6.
Figure 8:
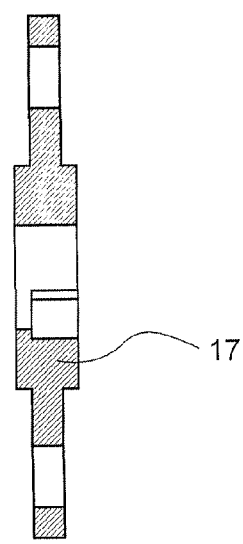
FIG. 8 is a cross section view of the spacer of the flow tripper assembly of FIGS. 6 and 7.
Figure 9:
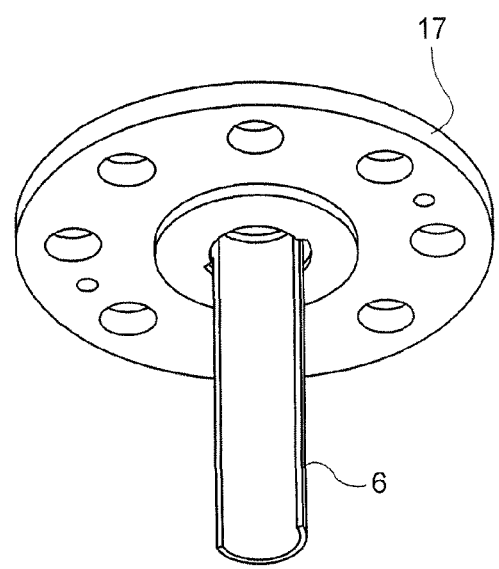
FIG. 9 is a perspective view of the flow tripper assembly of FIG. 6.

Referring to FIGS. 3 and 4, a standpipe flow tripper assembly 11 is provided in the standpipe 32. As shown in FIG. 3, the standpipe flow tripper assembly 11 includes a flow tripper, or disrupter, or spoiler 6. A first end of the spoiler 6 may be provided between the seals 9 and within the spacer 17. As shown in FIGS. 6-8, the first end of the spoiler 6 may be attached to the spacer 17, for example by welding 23. As shown in FIG. 9, the flow spoiler 6 may have a semi-circular cross section.

As shown in FIG. 3, the second end of the flow spoiler 6 extends into the steam line pipe 1 through an opening, or side-branch entrance, 33. The flow spoiler 6 is provided on a downstream side of the opening 33 with respect to a flow F that the steam line pipe 1 is configured to carry. The flow spoiler 6 has a trailing edge 31. Placing the trailing edge 31 of the flow spoiler 6 on the downstream side, instead of the upstream side, prevents the flow spoiler from interfering with the actuation of the safety relief valve.

Figure 10:
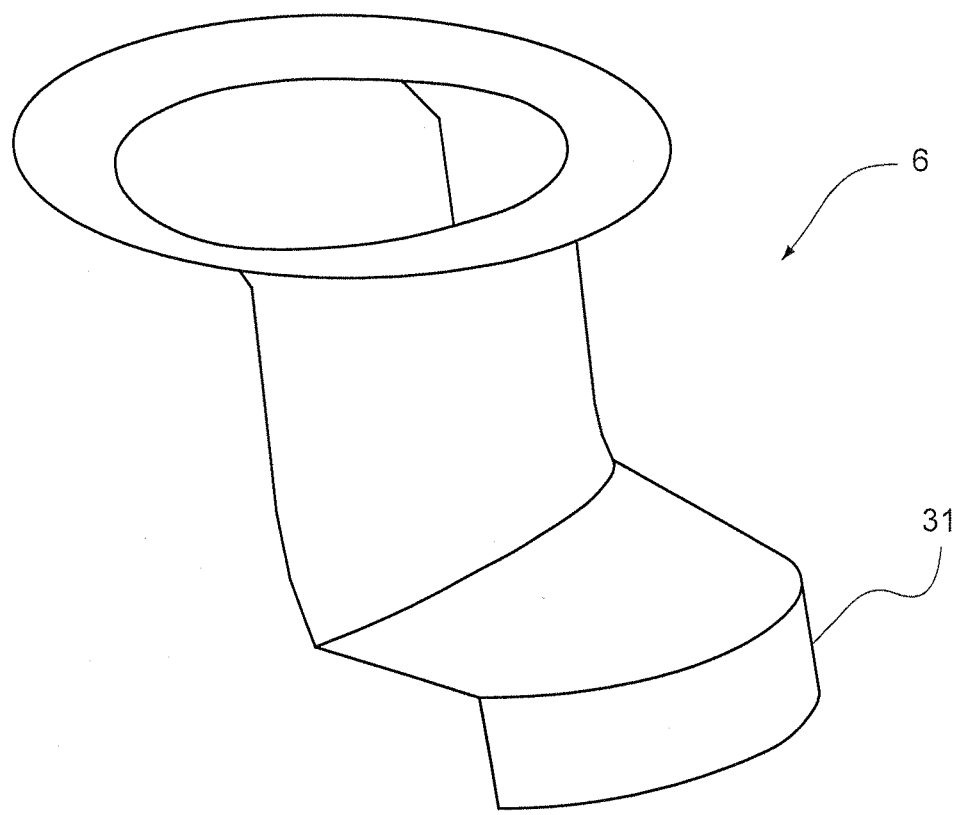
FIG. 10 is a perspective view of a flow tripper, disrupter, or spoiler according to another embodiment of the invention.

Referring to FIG. 10, a flow tripper, disrupter, or spoiler 6 according to another embodiment of the invention includes a trailing edge 31 that is offset. The first end of the flow spoiler 6 may be attached to the spacer 17 between the seals 9 in the manner described above, and the trailing edge 31 will be placed further downstream of the opening, or side-branch entrance, 33 of the steam line pipe 1 than the embodiment discussed above. The position of the trailing edge 31 of the flow spoiler 6 may be adjusted depending on the acoustic resonance frequency of the standoff pipe or relief valve.

The flow spoiler 6 disrupts the mutual resonance of the shear layer instability of flow past the opening 33 of the standpipe 32, and the acoustic resonance of the standpipe 32 or relief valve. The flow instability can not lock onto the acoustic mode of the standpipe 32 or relief valve entrance when the flow tripper, disrupter, or spoiler 6 is in place. In other words, the spoiler 6 disrupts the flow from exciting the acoustic standing wave. The flow spoiler 6 thus prevents loads in the standpipe 32 or the safety relief valve from becoming high.

The standpipe flow tripper assembly described herein also does not introduce any flow blockage (i.e. does not affect flow to downstream standpipes), is passive in its reduction or removal of the acoustic loading, and requires no external support. The standpipe flow tripper assembly described herein may thus be implemented very easily into existing plants. The standpipe flow tripper assembly also prevents high loading in the main steam lines and on such devices as steam dryers at flow conditions at which such loading would normally occur.

The standpipe flow tripper assembly also would enable or facilitate power uprates in nuclear power plants by eliminating a source of concern in power uprates, which is the increase of acoustic loads, with the attendant risk to steam dryers and other equipment.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of reducing an acoustic load of a standpipe connected to a first pipe configured to carry a flow, the method comprising:
   disrupting the flow in the first pipe at a downstream side of an opening in the first pipe to which the standpipe is connected, and
   suppressing a standing wave in the standpipe due to the disruption of the flow in the first pipe.

2. A method according to claim 1, wherein disrupting the flow comprises placing an edge of a flow tripper through the opening in the first pipe into the flow.

3. A method according to claim 2, wherein the edge has a semi-circular cross section.

4. A method according to claim 2, wherein the edge is offset from the opening in the downstream direction.

5. A method according to claim 1, further comprising: measuring a pressure in the standpipe.

6. A method according to claim 1, further comprising: measuring a pressure in the first pipe.

7. A method according to claim 2, further comprising: adjusting a position of the edge of the flow tripper in dependence on an acoustic resonance frequency of the standpipe.

8. A method according to claim 1, further comprising:
   measuring a pressure in the standpipe; and
   measuring a pressure in the first pipe.

9. A method according to claim 2, further comprising one of:
   adjusting a position of the edge of the flow tripper in dependence on an acoustic frequency of the standpipe; and
   adjusting a position of the edge of the flow tripper in dependence on an acoustic frequency of a relief valve connected to the standpipe.

10. A method to reduce an acoustic load of a standpipe connected at an opening to a first pipe configured to carry a flow, the method comprising:
    flowing a fluid through the first pipe, wherein the fluid flows across the opening in the first pipe to the standpipe and the opening is tangent to the flow of the fluid;
    disrupting the flow of the fluid in the first pipe at a downstream edge of the opening in the first pipe and without disrupting the flow of the fluid over an upstream edge of the opening, and
    suppressing a standing acoustic wave in the standpipe by the disruption of the flow in the first pipe.

* * * * *

UNITED STATES PATENT AND TRADEMARK OFFICE
CERTIFICATE OF CORRECTION

PATENT NO. : 9,574,693 B2
APPLICATION NO. : 13/212528
DATED : February 21, 2017
INVENTOR(S) : Lynch It is certified that error appears in the above-identified patent and that said Letters Patent is hereby corrected as shown below:

In the Specification

At Column 2, Line 4, change "anacoustic" to --an acoustic--

Signed and Sealed this
Second Day of May, 2017

Michelle K. Lee
*Director of the United States Patent and Trademark Office*